United States Patent [19]
Brinsfield

[11] Patent Number: 5,808,577
[45] Date of Patent: Sep. 15, 1998

[54] STEALTH AIRCRAFT IDENTIFICATION SYSTEM

[75] Inventor: James W. Brinsfield, Thousand Oaks, Calif.

[73] Assignee: Lockheed Martin Corporation, Palmdale, Calif.

[21] Appl. No.: 656,115

[22] Filed: May 31, 1996

[51] Int. Cl.[6] .................................................. G01S 13/78
[52] U.S. Cl. ................................................ 342/45; 342/6
[58] Field of Search .................................. 342/45, 5, 6, 2, 342/13

[56] References Cited

U.S. PATENT DOCUMENTS

| | | | |
|---|---|---|---|
| 4,716,417 | 12/1987 | Grumet | 343/708 |
| 4,987,418 | 1/1991 | Kosowsky et al. | 342/6 |
| 5,036,323 | 7/1991 | Cain et al. | 342/6 |
| 5,276,449 | 1/1994 | Walsh | 342/5 |
| 5,307,068 | 4/1994 | Hartemann | 342/1 |
| 5,375,008 | 12/1994 | Guerreri | 359/169 |
| 5,420,588 | 5/1995 | Bushman | 342/2 |
| 5,459,470 | 10/1995 | Wootton et al. | 342/45 |
| 5,534,866 | 7/1996 | Rose | 342/13 |
| 5,539,565 | 7/1996 | Waddoups et al. | 359/170 |
| 5,583,507 | 12/1996 | D'Isepo et al. | 342/45 |
| 5,600,325 | 2/1997 | Whelan et al. | 342/13 |
| 5,610,609 | 3/1997 | Rose | 342/13 |

*Primary Examiner*—John B. Sotomayor
*Attorney, Agent, or Firm*—Robert A. Schruhl

[57] ABSTRACT

The invention is an identification friend or foe system for an aircraft providing identification information when illuminated by an incident radar signal. In detail, the system includes at least a portion of the aircraft's surface incorporating magnetic material for absorption of at portion of the incident radar signal with the remainder reflected and scattered back in the direction of the incident radar signal. A electromagnetic coil assembly) is positioned behind the aircraft skin and is used to impress a biasing field on a portion of the aircraft's surface incorporating the magnetic material such that the biasing field modulates the reflected and scattered signal. A system is coupled to the coil assembly to modulate the biasing field such that the reflected and scattered signal from the portion of the aircraft's surface incorporating the magnetic material is modulated with an encoded signal incorporating the identification information.

5 Claims, 5 Drawing Sheets

FREQUENCY RESPONSE

FREQUENCY RESPONSE

STEALTH AIRCRAFT IDENTIFICATION SYSTEM

BACKGROUND OF THE INVENTION

1. Field of the Invention

The invention relates to the field of identification friend or foe (IFF) systems for aircraft and, in particular, to a IFF system for use on low observable aircraft wherein the stealth characteristics of the aircraft are not compromised.

2. Description of Related Art

The typical IFF system requires that the aircraft radiate electromagnetic energy via a special transponders and antennas. When the aircraft is detected by the radar, the operator can interrogate the transponder and determine its speed, heading, and altitude, etc. In fact, air traffic controllers can provide the aircraft's crew with an identification number that is entered into the aircraft's IFF system so that the aircraft can be automatically interrogated and indentified. On military aircraft, the information can be encrypted. On stealth aircraft, such prior art systems that radiate energy can not be used, for the very nature of these systems defeats the purpose of stealth, that is to remain totally undetected by the enemy. However, under battlefield conditions it may be necessary for a command and control organizations to track the stealth aircraft and provide necessary mission up-date information, ie., changes in target location, etc. In addition, in the rare case when the stealth aircraft is detected by a friendly radar during a combat scenario, the lack of an IFF system could lead to the aircraft coming under friendly fire. Furthermore, under combat conditions, even non-sealthy aircraft may dissable their IFF to preclude unwanted exploitation by unfriendly forces.

Thus it is a primary object of the subject invention to provide an identificaton friend or foe system for an aircraft.

It is another primary object of the subject invention to provide an identificaton friend or foe system for a stealth aircraft.

It is a further object of the subject invention to provide an identificaton friend or foe system for a stealth aircraft that does not degrade the stealth characteristics of the aircraft.

It is a still further object of the subject invention to provide an identificaton friend or foe system for a stealth aircraft that allows detection by a friendly aircraft that would otherwise not detect it.

SUMMARY OF THE INVENTION

The invention is an identification friend or foe system for an aircraft providing identification information when illuminated by an incident radar signal. The system is designed for use on stealth aircraft of the type that normally is not detected by either airborne, ground, or sea based radar systems. Such aircraft, typically, have exteral contours that re-direct return signals in non-threat directions so that little of the incident radar signal is detected. In addition, such aircraft are partially or completely coated with radar absorbing materials (RAM) and are fabricated using internal structures that also absorb the incident radar signal. If the RAM incorporates magnetic materials, the subject system can be used. Typical RAM includes iron particles dispersed in a resin matrix material, either as a paint or structural material (composite skin). There are, of course, other types of magnetic RAM materials that can be used. The magnetic RAM absorbs a significant portion of the incident radar signal and tends to scatter the remaining (return signal). While a stealth aircraft remains undetected, there is no problem. However, when detected by friendly radars in a hostile environment, it is important to be identified. In fact, it is desirable to provide a system for identification, even when the friendly radar would not ordinarily detect the aircraft.

The subject system provides this capability, while the aircraft remains undetectable by enemy radars. In detail, the system includes that at least a portion of the aircraft's surface incorporates magnetic material for absorption of at portion of the incident radar signal with the remainder reflected and scattered back in the direction of incident radar signal. Preferably, the aircraft skin is conductive and acts as a ground plane. A system is included to impress a biasing field on a portion of the aircraft's surface incorporating the magnetic material such that the biasing field modulates the reflected and scattered signal. The biasing field in impressed by means of a direct current electromagnetic biasing coil (Helmhotz type coil assembly) mounted behind the portion of the aircraft's surface incorporating the magnetic material. A system is coupled to the coil assembly to modulate the biasing field such that the reflected and scattered signal from the portion of the aircraft's surface incorporating the magnetic material is modulated with an encoded signal incorporating the identification information.

The system to modulate the biasing field includes a cipher code input device which provides a coded signal (code of the day) to a waveform encoder which, in turn, causes the biasing code to be impressed the encoded signal contained in the scattered return signal. The scattered return is not increased in any way and, in fact, may be decreased in some cases. Thus the aircraft remains undetectable in most situations by enemy radar. Even friendly aircraft could not detect the aircraft, unless they incorporated a properly coded coherent signal processor. The friendly aircraft would only see background noise. However, with the aircraft incorporating properly coded coherent equipment and having the codes of the day, it can detect the coded signal even though the aircraft overall return signal is below the detection threshold. In the rare instances, when the stealth aircraft is actually detected by a friendly radar, this system, by allowing identification, will prevent the aircraft from coming under friendly fire.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
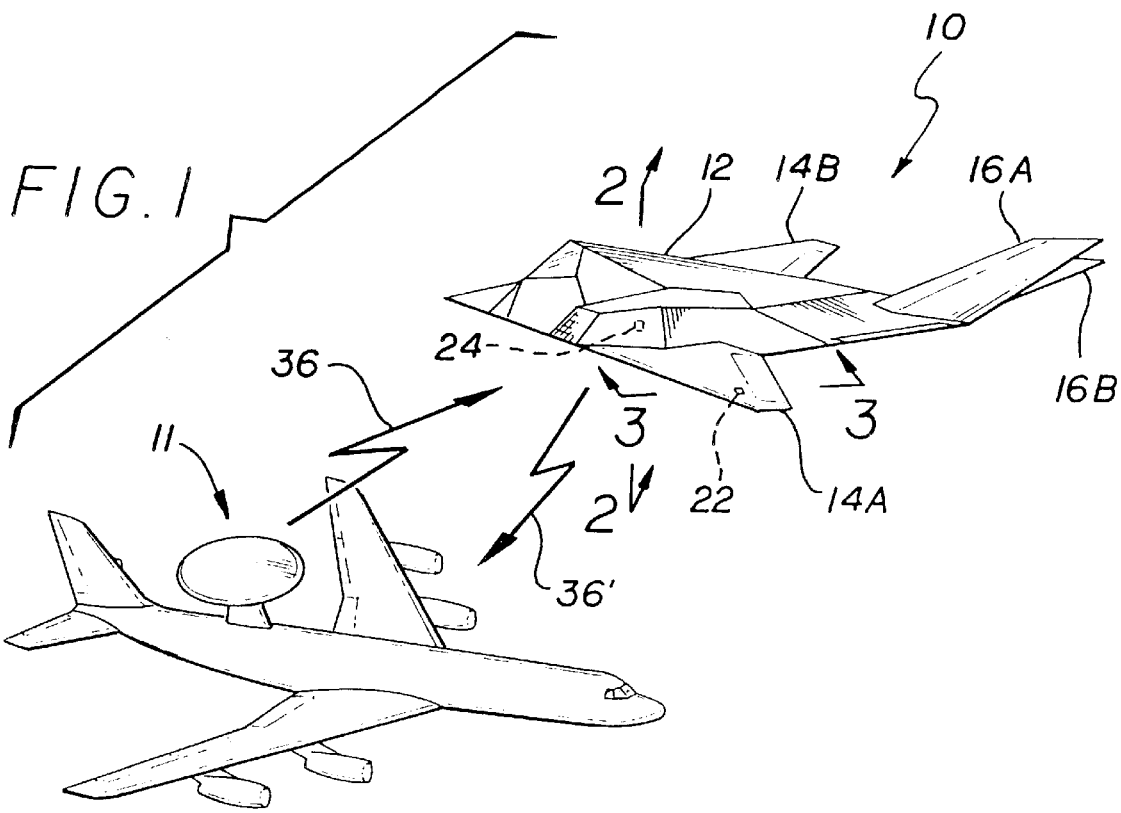
FIG. 1 is a perspective view of a stealth aircraft incorporating the subject IFF system and an early warning aircraft that is attempting to identify the stealth aircraft.

Referring to FIG. 1, a Lockheed Martin Corporation F-117A stealth aircraft is illustrated and generally indicated by numeral 10 along with a airborne early warning aircraft 11. The aircraft 10 includes a fuselage 12, wings 14A and 14B, and elevons 16A and 16B. Such aircraft are virtually undetectable by radar, unless the aircraft is extremely close to the radar. Thus it is important for such aircraft to know where friendly aircraft under their control are positioned. The early warning/mission control aircraft 11 have powerful radars and are used as airborne battle control stations. If the aircraft 10 were detected without some sort of identification technique, it could be assumed to be hostile, and fighter aircraft could be directed to intercept and destroy it. Alternately, ground based missiles could be launched. In addition, knowledge of the aircraft's 10 position is needed so that it could be directed to a target or informed of possible threats over secure channels of communication. Thus a covert IFF system is desirable. For purposes of illustration, the aircraft 10 is illustrated with two IFF systems, generally indicated by numeral 22, mounted on the wings 14A and 14B and two mounted on either side of the fuselage with only one shown and indicated by numeral 24. Of course, additional systems could be incorporated on the aircraft.

Figure 2:
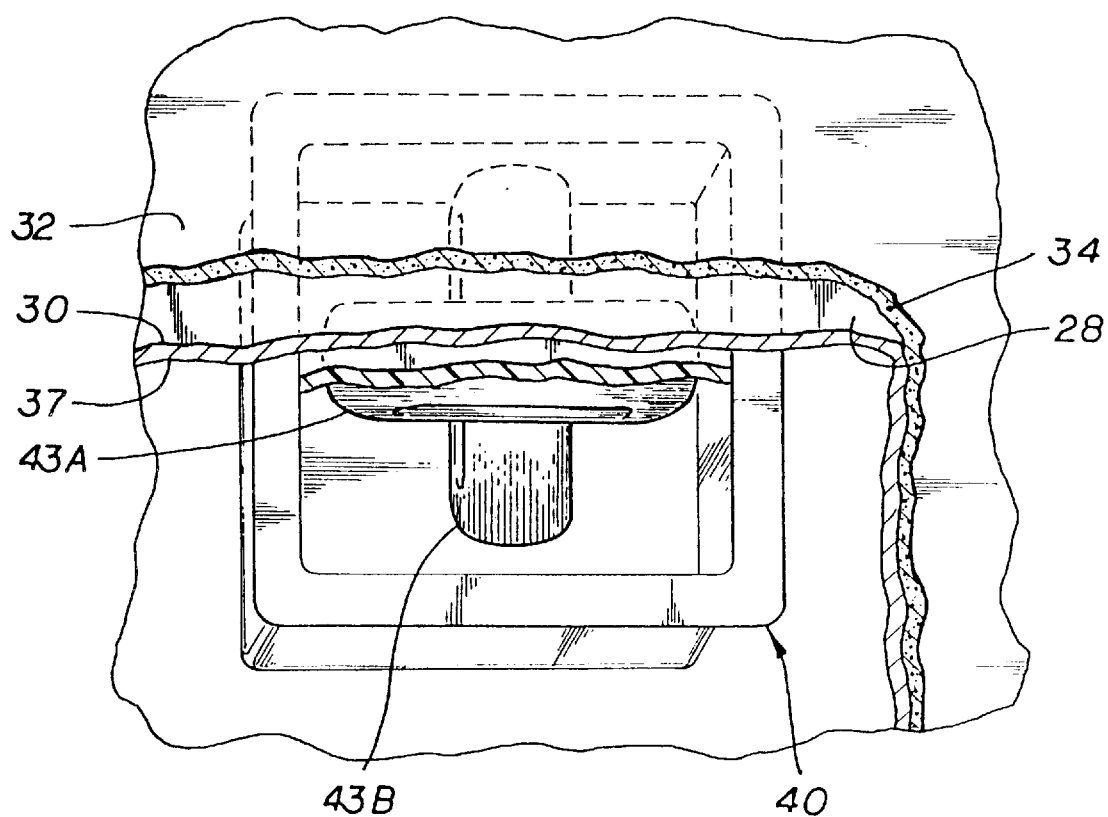
FIG. 2 is partial cross-sectional perspective view of the stealth aircraft shown in FIG. 1 taken along the line 2—2, illustrating the IFF system in semi-schematic form.
Figure 3:
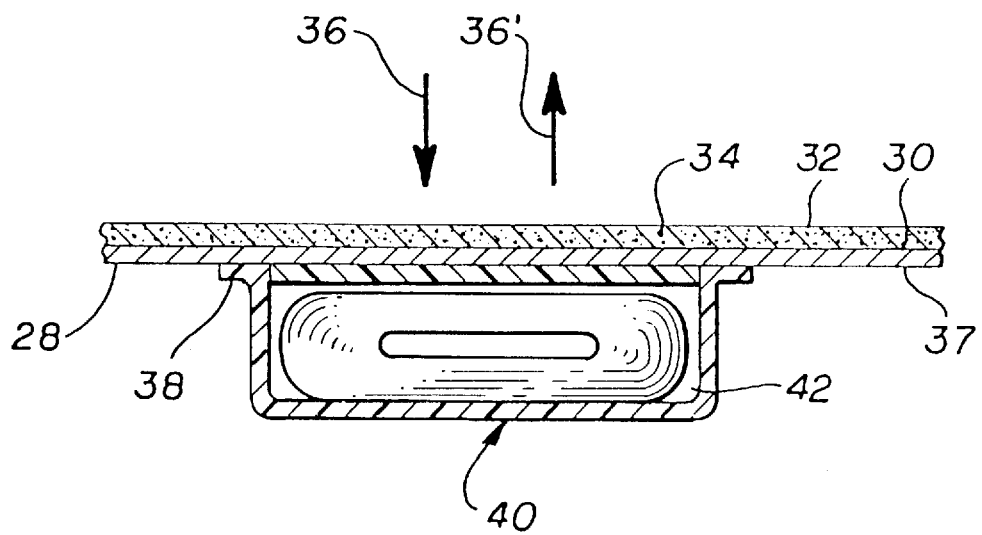
FIG. 3 is partial cross-sectional view of the stealth aircraft shown in FIG. 1 taken along the line 3—3, also illustrating the IFF system in semi-schematic form.

Still referring to FIG. 1 and additionally to FIGS. 2 and 3 the IFF systems 22 and 24 include at least a portion of the aircraft's skin 28 incorporates magnetic material as a radar absorber on its exterior side 30 and, as illustrated, the radar absorbing coating is a resin layer 32 filled with iron particles 34. These particles 34 can be spherical shaped or short fibers; other types of magnetic absorbers can also be used. This type of absorbing coating will effectively absorb a significant portion of the incident radar signal indicated by arrow 36 shown in FIG. 1 and reflect and scatter the remainder back toward the aircraft 11 indicated by arrow 36'.

Figure 4:
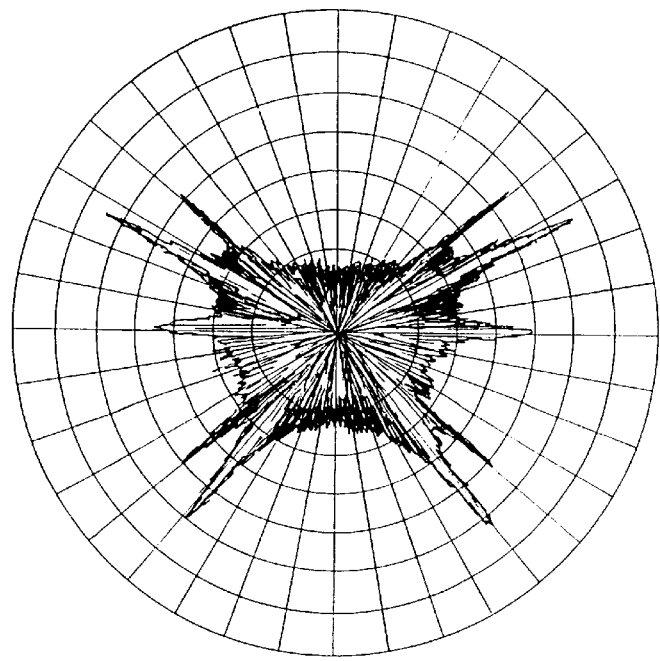
FIG. 4 is a polar graph of the radar cross-section of a typical stealth aircraft
Figure 5:
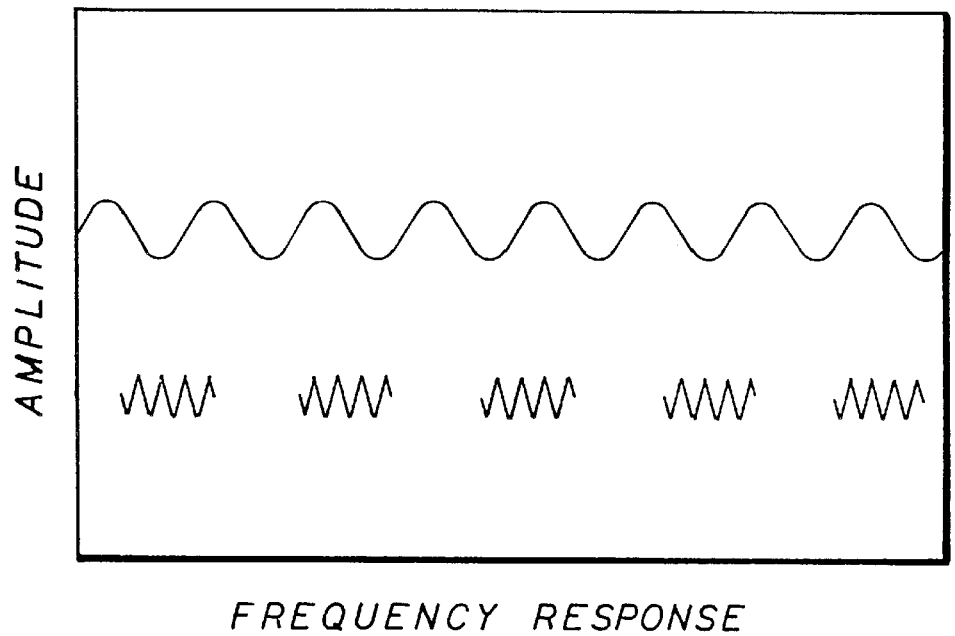
FIG. 5 is graph plotting frequency against return signal amplitude of a typical radar signature of a stealth aircraft including the modulated scattered signal.
Figure 6:
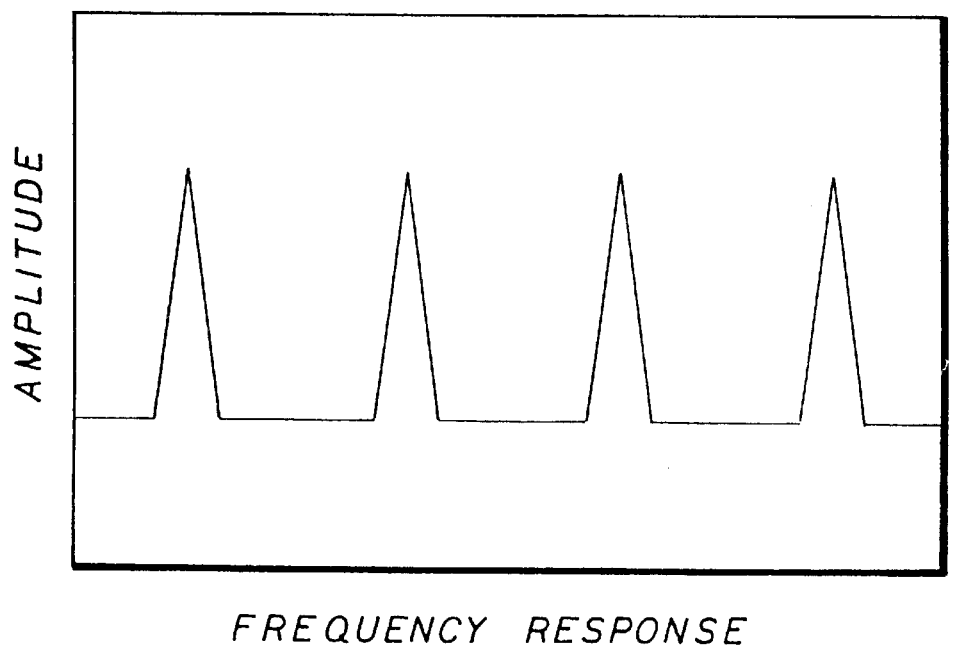
FIG. 6 is graph plotting frequency against return signal amplitude of a typical radar signature of a stealth aircraft incorporating the subject IFF system after integration of the modulated signal over a descreate period of time.

The typical stealth aircraft will scatter incoming radar energy in a pattern similar to the polar plot shown in FIG. 4. What the aircraft 11 sees on its radar is background noise as illustrated in FIG. 5, which is a generalized plot of return signal versus frequency with the radar signature emersed therein. Referring back to FIGS. 1–3, a housing 40 is mounted on the opposite side 37 of the skin 28 (the skin acts as a ground plane). Mounted in the housing 40 of the system 22 is a single coil 42 that is used to produce a biasing field when energized causing the return signal 36' to be modulated. In the system 24 shown in FIG. 3, two coils 43A and 43B are mounted at 90 degrees to each other, providing dual polarization, which will also cause the return signal 36' to be modulated. As illustrated in FIG. 6, after integration over a period of time, what emerges is the encoded signal.

Figure 7:
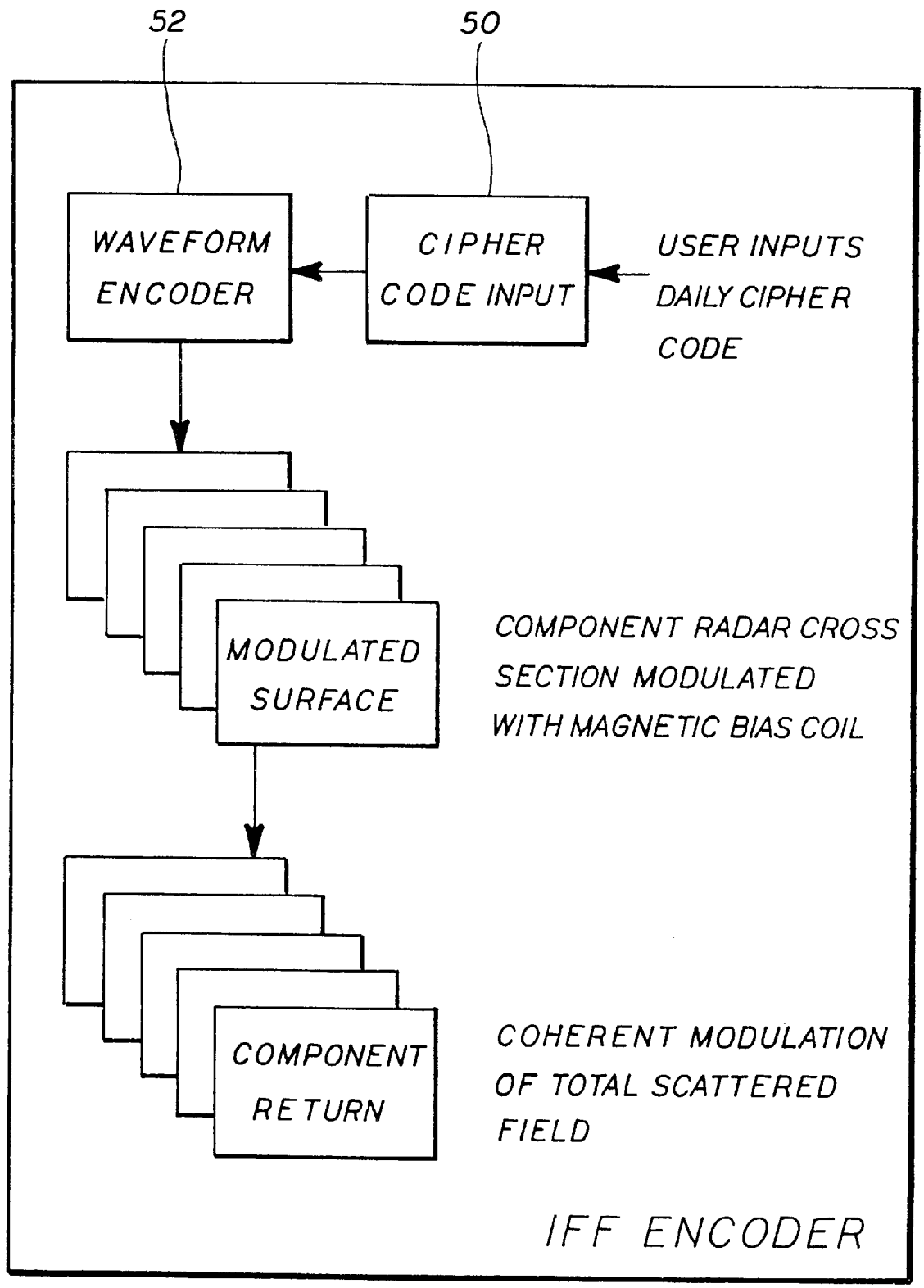
FIG. 7 is a block diagram of the process of encoding an IFF signal on to the reflected and scattered radar return signal.
Figure 8:
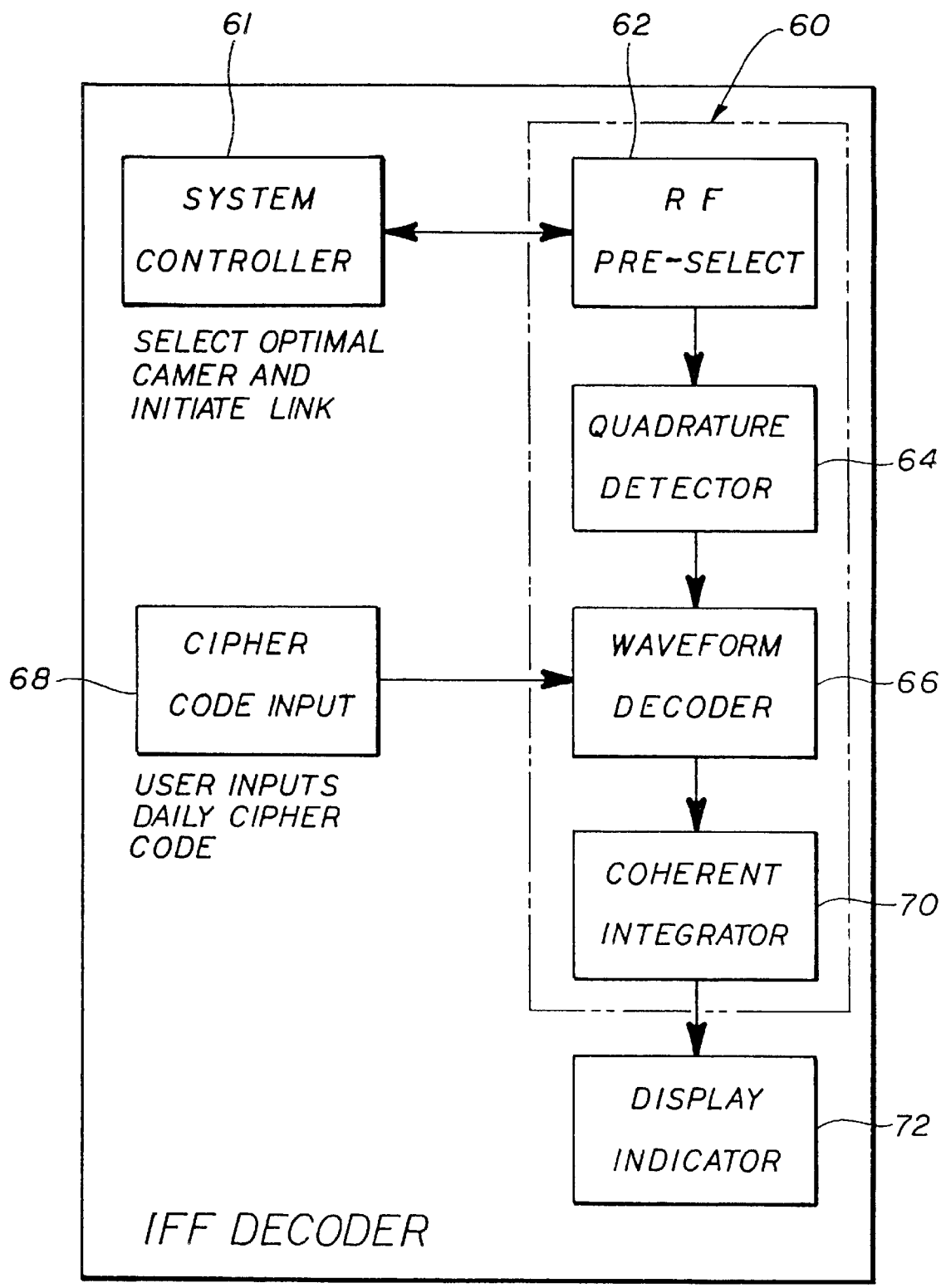
FIG. 8 is a block diagram of the process of decoding the encoded IFF signal on to the reflected and scattered radar return used on the friendly aircraft of detecting the stealth aircraft.

Referring to FIGS. 7 and 8, the basic cipher encoder/decoder system functions similar to existing IFF Mode IV systems presently utilized by the military. The IFF encoder module 50 is used to input a code that is changed on a daily basis. The digital output signal from the encoder module 50 is sent to a wave form encoder unit 52 which converts the digital signal to a DC analog signal that is sent to the coil 42 and coils 43A and 43B of the systems 22 and 24, respectively. The digital signal from input unitizes a digitally pre-set cipher code to modulate the return signal 36'. The modulated signal is received by the aircraft 11 and a conventional coherent signal integrator system 60 is used to coherently process the received signal 36'. A system controller 61 is used to set the devise in either a passive (depending on illumination by radar from another aircraft or from the ground) or active mode (using the aircraft's radar). It includes a frequency selector 62 coupled to a quadrature detector (phase and amplitude detector) 64, which in turn is coupled to a waveform decoder 66. The wave form decoder receives code of day inputs from the cipher code input system 68. Finally the output from the wave code decoder is fed to a coherent integrator 70 with its output fed to a display indicator. What occurs is that monitoring the return signal over a discrete period of time will allow the coherent integrator 70 to sample the return signal 36' until the encoded signal is "brought out" from the background noise. A display unit 72 is coupled to the coherent signal integrator system 60

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the military aircraft industry.

I claim:

1. An identification friend or foe system for an aircraft providing identification information when illuminated by an incident radar signal, the system comprising:

at least a portion of the aircraft's surface incorporating magnetic material for absorption of at portion of the incident radar signal with the remainder reflected and scattered back in the direction of incident radar signal;

means to impress a biasing field on a portion of the aircraft's surface incorporating said magnetic material such that the biasing field modulates the reflected and scattered signal; and means to modulate the biasing field such that the reflected and scattered signal from said portion of the aircraft's surface incorporating said magnetic material is modulated with an encoded signal incorporating the identification information.

2. The system as set forth in claim 1 wherein said biasing means is a direct current electro-magnetic biasing coil mounted behind said portion of the aircraft's surface incorporating said magnetic material.

3. The system as set forth in claim 2 wherein said electro-magnetic biasing coil provides dual polarization.

4. The system as set forth in claim 3 wherein said magnetic material is positioned over a ground plane; and said biasing coil is positioned on the opposite side of said ground plane.

5. The system as set forth in claim 4 wherein said electo-magnetic biasing coil assembly is a Helmhotz type coil assembly.

* * * * *